US008300501B2

(12) United States Patent
Varghese et al.

(10) Patent No.: US 8,300,501 B2
(45) Date of Patent: Oct. 30, 2012

(54) SUPERCAVITATING PROJECTILE TRACKING SYSTEM AND METHOD

(75) Inventors: Abraham N. Varghese, Wakefield, RI (US); Robert Kuklinski, Portsmouth, RI (US); Thomas J. Gieseke, Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 206 days.

(21) Appl. No.: 12/646,318

(22) Filed: Dec. 23, 2009

(65) Prior Publication Data
US 2011/0149691 A1    Jun. 23, 2011

(51) Int. Cl.
*G01S 3/80*    (2006.01)
(52) U.S. Cl. .......................... 367/129; 367/124; 367/127
(58) Field of Classification Search .................. 367/127, 367/129
See application file for complete search history.

(56) References Cited

U.S. PATENT DOCUMENTS

| | | | | | |
|---|---|---|---|---|---|
| 3,588,794 | A | * | 6/1971 | Francis | 367/95 |
| 5,231,866 | A | * | 8/1993 | Peacock | 73/40.5 A |
| 5,703,835 | A | * | 12/1997 | Sharkey et al. | 367/124 |
| 5,995,445 | A | * | 11/1999 | Whitesell et al. | 367/5 |
| 7,283,424 | B1 | * | 10/2007 | Kuklinski | 367/118 |
| 7,362,657 | B1 | * | 4/2008 | Donahoe et al. | 367/136 |
| 2003/0217873 | A1 | * | 11/2003 | Paradiso et al. | 178/18.04 |
| 2004/0047238 | A1 | * | 3/2004 | Ruffa | 367/131 |
| 2004/0075605 | A1 | * | 4/2004 | Bradford et al. | 342/95 |
| 2007/0237030 | A1 | * | 10/2007 | Barger et al. | 367/127 |
| 2009/0201763 | A1 | * | 8/2009 | Jones et al. | 367/5 |
| 2010/0246321 | A1 | * | 9/2010 | Howard et al. | 367/5 |

FOREIGN PATENT DOCUMENTS
WO    WO 2007132243 A1 * 11/2007

OTHER PUBLICATIONS

Ge Martin., "Horizontal Disc Random Array Performance", Naval Oceans Systems Center Technical Report. NOSC-TR-471. Sep. 1979., 47 pages.*

* cited by examiner

*Primary Examiner* — Isam Alsomiri
*Assistant Examiner* — James Hulka
(74) *Attorney, Agent, or Firm* — James M. Kasischke; Michael P. Stanley; Jean-Paul A. Nasser

(57) ABSTRACT

A system for three-dimensional tracking of high speed undersea projectiles may utilize a distributed field of randomly positioned passive acoustic sensors. The system measures variables related to the pressure field generated by a supercavitating projectile in flight wherein the amplitude of the pressure generated at a point in space is related to the projectile dimensions, velocity, and trajectory. The system iteratively processes data from the sensors to measure launch velocity, flight direction (trajectory), ballistic coefficient (drag), and/or maximum range.

16 Claims, 5 Drawing Sheets

SUPERCAVITATING PROJECTILE TRACKING SYSTEM AND METHOD

STATEMENT OF GOVERNMENT INTEREST

The invention described herein may be manufactured and used by or for the Government of the United States of America for governmental purposes without the payment of any royalties thereon or therefore.

CROSS-REFERENCE TO RELATED PATENT APPLICATIONS

None.

BACKGROUND OF THE INVENTION (1) Field of the Invention

The present invention relates generally to tracking systems and, more particularly, to tracking systems and methods for tracking in real time the trajectory and velocity of underwater objects which may be traveling at high speeds utilizing data which may come from randomly spaced passive pressure sensors.

(2) Description of the Prior Art

The tracking of a high speed (above the incompressible limit, about 0.3 Mach) underwater projectiles with conventional acoustic range systems, several of which are discussed hereinafter, is impractical. For bodies that move at very low Mach numbers, acoustic ranging solutions are convenient. As the sonic speed is approached or reached, conventional acoustic ranging techniques are unreliable. Moreover, the high-speed projectile in relation to the acoustic propagation from the test body creates great difficulty in accurately determining the position from which the acoustic radiation originated.

U.S. Pat. No. 7,283,424, issued Oct. 16, 2007, to Kuklinski, discloses a system and a method to accurately track the trajectory of high-speed underwater objects. A number of hoops with means for controlling the buoyancy thereof are aligned on a range in the anticipated path of the high speed projectile. The hoops are sufficiently large relative to the size of the projectile and anticipated path. Each hoop contains a number of independent hydrophones. The signals from the hydrophones may be analyzed to accurately determine position and track of an underwater projectile along the plane of each hoop. The system may be used as a fixed range or as a mobile range in a remote location.

This patent is limited in many ways. For instance, Kuklinski requires precise acoustic sensor positioning. Kuklinski utilizes an acoustic signal rather than peak pressure signals and times of arrival. Real time solutions are not available. Moreover, Kuklinski does not necessarily provide solutions for a number of desirable variables within a desired error tolerance including ballistic drag and initial velocity (or velocity adjacent the first sensor).

The following U.S. patents describe various prior art acoustic tracking systems:

U.S. Pat. No. 4,639,900 issued Jan. 27, 1987, to Gustafson, discloses three or more listening devices that are dispersed over the water area where the location of a sound source is to be determined and transmit radio signals over respective channels to a master station upon detecting sound. The master station correlates the signals from selected ones of the listening devices to derive the position of the sound source relative to those listening devices. If the positions of those listening devices are unknown, for example if the devices are floating free, their positions are determined by the master station by comparing the relative times at which an identifying radio signal transmitted by each listening device is received by the master station directly and relayed from each of two stationary radio stations with known positions. The listening devices may also be provided with receivers for receiving radio command signals from the master station, for example relating to activation of certain listening devices and assignment of radio channels.

U.S. Pat. No. 5,359,575 issued Oct. 25, 1994, to Williams et al, discloses apparatus and methods for improving signal, detection and tracking in underwater acoustic devices receiving a set of acoustic pulses propagated in response to repetitive synchronizing events. Each pulse is correlated with a replica in a receiver in the underwater devices during an associated time window. The correlated output of the receiver is compared to an adjustable threshold characteristic in a detector for selection of the actual pulse according to predetermined criteria for each of the set of pulses. An actual time of reception relative to the synchronizing event is assigned to the selected pulse. Previous actual times of reception are used to estimate the expected time of reception of the associated pulse relative to the next synchronizing event. The estimate is used to adjust the associated time window to encompass the expected time of reception. Previous actual times of reception are compared to corresponding estimated times of reception to develop a measure of the quality of the estimates. The shape of the threshold characteristic and the width of the associated time window are adjusted as a function of the measure of the quality. A preferred threshold characteristic has a parabolic shape with its vertex defining a minimum threshold level at the expected time of reception. High quality measures lower the minimum threshold and narrow the parabola and the time window; low quality measures raise the minimum threshold level and broaden the parabola and the time window. Adaptive signal tracking is thereby provided.

U.S. Pat. No. 5,377,162, issued Dec. 27, 1994, to Jestin et al, discloses a real time passive trajectography device that comprises at least three pairs of sensors. Each pair of sensors is separated from the other pairs of sensors by a distance which is greater than the distance separating each of the sensors of the pair. Of each pair of sensors, the output signal from a first sensor is used as a reference signal. The output signal from a second sensor is compared to the output signal of the first signal based on a presumed speed of the object being tracked. The presumed speed is continually updated until a maximum correlation between the first and second output signals is obtained. The measurement and correlation operation is repeated at predetermined intervals, with the initial presumed speed extrapolated from the trajectory previously computed during previous intervals. Prior to the speed analysis, the output signals from the sensors are digitized. The output signals are then homogenized and made coherent by a white noise operation to free the information content of the signals from their power throughput. In order to achieve approximate real time operation, a computer for performing the signal analysis includes vectorial cards and has a parallel architecture.

U.S. Pat. No. 5,457,662 issued Oct. 10, 1995, to Forster, discloses a device for locating noise emitters with an antenna comprising passive sensors. In a preferred variant, the antenna consists of N acoustic buoys each comprising a pair of hydrophone dipoles exhibiting a double-eight directivity diagram. Each buoy comprises a compass providing a signal representing the heading relative to magnetic North. The pairs of signals are subjected to a rotation. The signals are next digitized and the number of noise emitters is estimated. The locating of these noise emitters can be performed according to two variants.

U.S. Pat. No. 5,481,505 issued Jan. 2, 1996, to Donald et al, discloses a method and apparatus for detecting, processing and tracking sonar signals to provide bearing, range and depth information that locates an object in three-dimensional underwater space. An inverse beamformer utilizes signals from a towed horizontal array of hydrophones to estimate a bearing to a possible object. A matched field processor receives measured covariance matrix data based upon signals from the hydrophones and signals from a propagation model. A nearest neighbor peak picker provides plane wave peaks in response to output beam levels from the matched processor. A five-dimensional M of N tracker identifies peaks within the specified limit of frequency, bearing change over time, range and depth to specify an object as a target and to display its relative range and depth with respect to the array of hydrophones.

U.S. Pat. No. 6,937,539 issued Aug. 30, 2005, to Kervern et al, discloses processing of signals sent by passive buoys dropped from an aircraft so as to compile EGP (Energy Geographic Plot) maps. The process is split into three steps: the first makes it possible to produce an EGP map of the x, y positions of the noise sources, the second makes it possible to associate the velocities with certain designated positions and the third makes it possible to eliminate the noise sources regarded as hampering the readability of the maps.

U.S. Pat. No. 7,266,044, issued Sep. 4, 2007, to Yang, discloses an apparatus for processing passive acoustic signals received on a horizontal line array that were either emitted from an underwater object or echo returned from an object, and is proposed to track the motion (bearing change and range change) of an object (target) relative to the receiver horizontal line array. Adaptive array processing for a moving object is biased for a moving source when the number of data samples is limited by the stationariness condition. Motion compensation can be carried out in the beam domain by beam shifting for a bearing changing object and frequency shifting for a range changing object. The method includes receiving acoustic signals from the target, determining the beam covariance matrices, determining the target bearing rate and range rate, processing the beam covariance matrices by compensating for the target motion, and producing a beam power plot versus time. Interference signal is suppressed when the interference source does not have the same motion (bearing and range rate) as the target. The method does not need detailed environmental acoustic information of the sound channel normally required to model the sound propagation.

The above cited prior art does not disclose a method to determine the position in space, the position in time, and the track of a traveling underwater body from a set of data which may arise from randomly spaced passive acoustic sensors.

Consequently, those skilled in the art will appreciate the present invention that addresses the above and other problems.

SUMMARY OF THE INVENTION

It is a general purpose of the present invention to provide an improved system and method to measure the velocity and/or trajectory of an underwater object which may be moving at high speeds in the subsonic or supersonic range.

An object of the present invention is to passively track underwater objects traveling at any subsonic speed.

Another object of the present invention is to track underwater objects with the sensor field that is randomly distributed.

Another object of the present invention is to operate in real time.

Accordingly, the present invention provides a system for tracking an underwater object traveling at near sonic or supersonic speeds, which may comprise elements such as, for example, a plurality of randomly distributed passive pressure transducers at positions offset from a path of the underwater object. The pressure transducers detect a peak transient pressure produced in response to a changing pressure field created by the underwater object. A data flow path is utilized for transferring data produced by the plurality of randomly distributed passive pressure transducers. At least one processor is programmed to utilize the data produced by the plurality of randomly distributed passive pressure transducers to quickly determine a trajectory of the underwater object.

The processor is preferably programmed to utilize a time of occurrence of the peak transient pressure and amplitude of the peak transient pressure to determine the trajectory. The processor may also be programmed to determine other information such as, for example, a ballistic coefficient of the underwater object.

In one possible embodiment, the plurality of passive pressure transducers may be randomly positioned within one or two hundred feet of the path of the underwater object. The passive pressure transducers may comprise directional transducers but could also comprise omnidirectional pressure transducers.

In one possible embodiment, the processor is programmed to iteratively produce a solution based on an initial estimate of a plurality of variables.

The present invention also provides methods for detecting velocity and trajectory of an underwater object traveling at near sonic or supersonic speeds. Steps in the method may comprise supporting a plurality of passive pressure transducers in water at a plurality of depths with the plurality of passive pressure transducers being arranged in the water so as to extend along at least a portion of a path of the underwater object. Other steps may comprise producing acoustic signal data that may comprise peak transient pressures and peak transient pressure times of arrival with respect to times at which the underwater object passes a point of closest approach for each of the plurality of passive pressure transducers. The method may further comprise utilizing the peak transient pressures and time of arrivals of the peak transient pressures to determine the velocity and trajectory of the underwater object.

The method may further comprise providing that the plurality of passive pressure transducers are randomly positioned within one hundred feet of the path of the underwater object and/or utilizing directional passive pressure transducers and/or utilizing less than twenty but more than ten of the passive pressure transducers.

The method may further comprise programming a processor to determine a ballistic coefficient of the underwater object and/or programming a processor to iteratively produce a solution for the velocity and the trajectory based on an initial estimate of a plurality of variables.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DETAILED DESCRIPTION OF THE INVENTION

Figure 1:
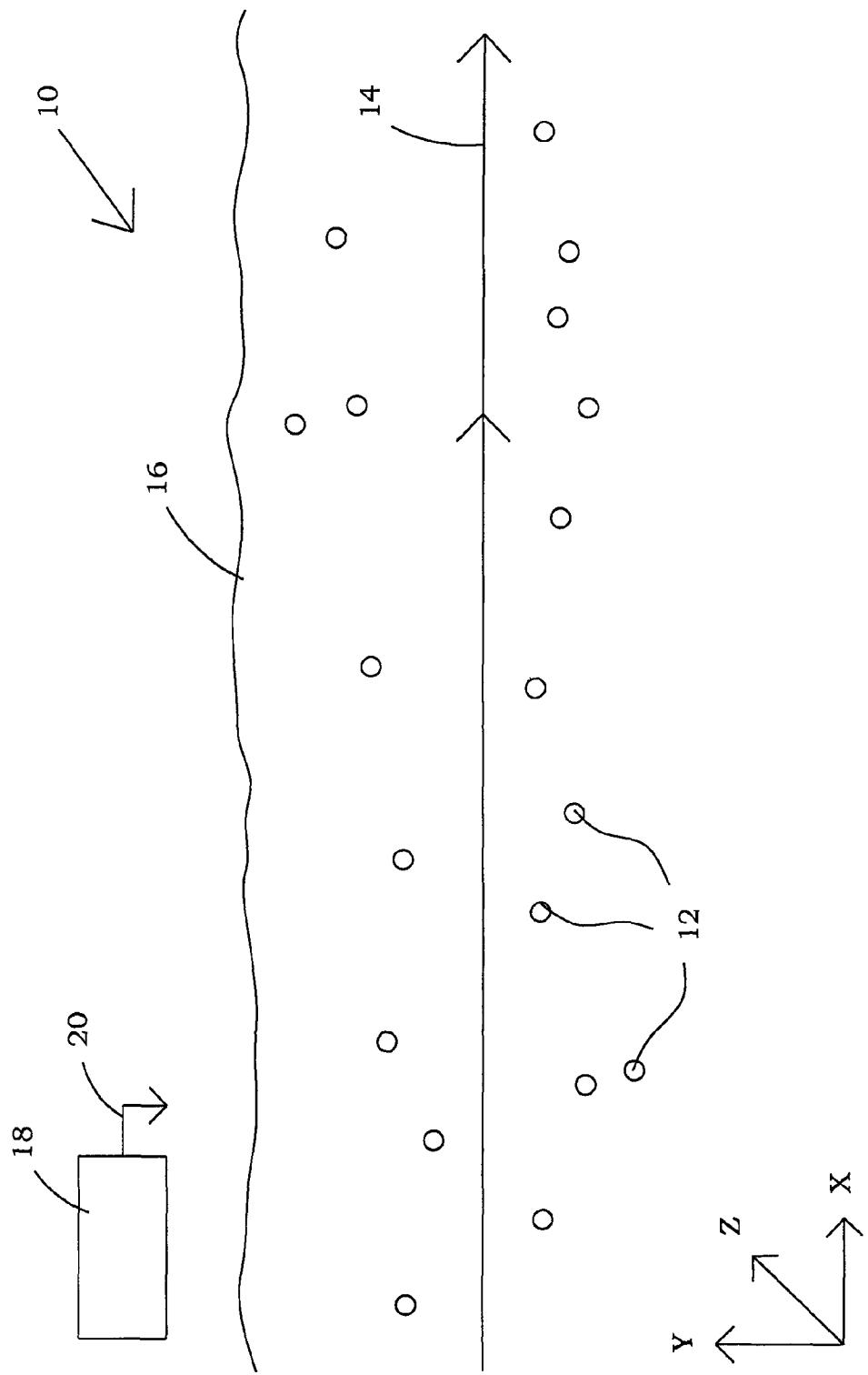
FIG. 1 is a diagrammatic view of an underwater tracking system in accord with one embodiment of the present invention.

Referring now to the drawings, and more particularly, to FIG. 1 there is shown tracking system 10 which may be utilized to measure variables which describe the three-dimensional underwater track or path 14 of a supercavitating vehicle under surface 16 of a body of water. In this embodiment, passive acoustic or pressure transducers 12 are utilized to measure a pressure field produced by a moving supercavitating vehicle. The present invention provides a low-cost, reusable, and robust system to measure the performance of projectiles in an open range environment.

In one embodiment of the invention, passive acoustic or pressure transducers 12 may be randomly distributed along path 14 of the supercavitating vehicle. The information from the transducers is provided to computer 18 utilizing data flow path 20, which may comprise any suitable means for transferring signals from passive acoustic or pressure transducers 12 to computer 18 including wireless, wired or fiber optic transmission lines. Computer 18 is programmed in accord with the methods of the present invention to provide velocity, trajectory, and/or other information.

The solutions may be calculated sufficiently quickly to be considered produced in "real time." For example, a defense system might theoretically be able to utilize the "real time" information from computer 18 for aiming defensive weapons at an incoming projectile. In one embodiment, the solutions may be determined within less than 0.0001 seconds, or in less than 0.001 seconds, or in less than 0.01 seconds.

System 10 is based on measurement of the pressure field generated by a supercavitating projectile. Quantities of interest include launch velocity, flight direction, and ballistic coefficient. The theoretical basis of the method is tied to what is considered to be a predictable pressure field generated by a supercavitating projectile during flight. The amplitude of the pressure peak generated at points in space and the times that the peak pressures occur is related to the projectile dimensions, velocity, and the trajectory.

It has been shown experimentally that transient pressure of the order of several Pa are produced by subsonic projectiles, e.g., 1000 m/s, at a considerable distance (several meters). A distinction between the present invention and traditional acoustic tracking systems is that pressures are not necessarily acoustic in nature. The pressures of interest are field pressures produced as a result of the hydrodynamics of a body moving through a medium. The pressure can be thought of as a disturbance that moves with the high-speed body.

The three-dimensional structure of this disturbance field has a predictable form, which is used by the tracking system of the present invention. As a high-speed body approaches and passes a transducer fixed in space, the pressure sensed by that transducer will rapidly rise and then fall as the high-speed body passes.

For subsonic projectiles, the time at which the peak pressure is reached is approximately the time at which the projectile is at the point of closest approach. However, slight variations exist in the time of arrival of the pressure peak with respect to time at which the projectile passes the point of closest approach. The amplitude of the peak pressure is a function of the minimum distance between the high-speed body trajectory and the transducer location, the speed, and the size of the high-speed body.

In accord with one embodiment of the present invention, by using an array of transducers distributed in the field through which the high-speed body passes to measure the time of occurrence and amplitude of peak transient pressures, it is possible to calculate the high-speed body trajectory.

The deceleration of a projectile in flight is described in the following equation:

$$M\frac{\partial^2 s}{\partial t^2} = -1/2\rho C_d A\left(\frac{\partial s}{\partial t}\right)^2 \quad (1)$$

where M is the mass of the projectile, $\rho$ is the density of the environmental fluid, $C_d$ is the coefficient of drag, and A is the cross-sectional area of the projectile.

Integration one time yields a solution for velocity:

$$\frac{\partial s}{\partial t} = U_0/(1 + \alpha U_0 t), \quad (2)$$

where $U_0$ is the initial velocity, t is time, and the parameter $\alpha$ is defined as:

$$\alpha = \frac{\frac{1}{2}\rho C_d A}{M}. \quad (3)$$

Integration a second time yields a solution for distance traveled as a function of time:

$$s = s_0 + \frac{1}{\alpha}\ln(1 + \alpha U_0 t). \quad (4)$$

It can be assumed that the direction of projectile travel is constant and is defined by the unit vector $\vec{\eta}$. If a transducer is placed at a location $\vec{x}$ in the field, the path of the projectile will reach its point of closest approach $\vec{y}$ when the following condition is met:

$$\vec{x}\cdot\vec{\eta} = \vec{y}\cdot\vec{\eta}. \quad (5)$$

If a multitude of sensors are used to track the projectile, the origin of flight is defined as the point of closest approach to the first transducer $\vec{y}_1$. This point is also considered herein as the origin of the projectile trajectory. The location along the projectile trajectory of the point of closest approach to the second transducer is $\vec{y}_2$, and so forth, defining a set of equations:

$$\vec{x}_1 \cdot \vec{\eta} = \vec{y}_1 \cdot \vec{\eta}.$$

$$\vec{x}_2 \cdot \vec{\eta} = \vec{y}_2 \cdot \vec{\eta}. \tag{6}$$

and the like.

Each equation contains five unknowns (two components of the direction vector $\vec{\eta}$ and the point of closest approach $\vec{y}$).

The peak amplitude of pressure seen at a transducer location is assumed to be some nonlinear function of minimum distance to the projectile track (distance to the point of closest approach) and the projectile speed. The projectile speed at the point of closest approach is given by $$U_i = \{U_0 / (1 + \alpha U_0 (dt_i + h(P_i)))\} \tag{7}$$

and the pressure is expressed in a general form as $$P_i = (U_i, R_i) \tag{8}$$

where $$R_i = \|(\vec{x}_i - \vec{y}_1)\|. \tag{9}$$

In these equations, time t has been replaced by $dt_i - h(P_i)$. The function $h(\ )$ corrects for slight variations in the time of arrival with respect to time at which the projectile passes the point of closest approach. For subsonic projectiles, this function is approximately 0.

The points of closest approach are related to each other based on the projectile trajectory and the time at which the peak transient pressure is realized. The point of closest approach for transducer i is the origin (point of closest approach to the first transducer) plus the distance traveled in time dt in the direction of the trajectory $\vec{n}$.

$$\vec{y}_i = \vec{y}_1 + \vec{\eta}_i \left( \frac{1}{\alpha} \ln(1 + \alpha U_0 (dt_i - h(P_i))) \right) \tag{10}$$

Table 1 lists variables utilized in expanded equations as follows:

$$0 = V_1(y_{1,i} - V_{5i+5}) + V_2(y_{2,i} - V_{5i+6}) + (1 - V_1^2 - V_2^2)^{1/2}(y_{3,i} - V_{5i+7}) \tag{11}$$

$$y_{1,i} = V_5 + [V_1/V_3] \ln(1 + V_3 V_4 (V_{5i+4} - h(V_{5i+3}))) \tag{12}$$

$$y_{2,i} = V_6 + [V_2/V_3] \ln(1 + V_3 V_4 (V_{5i+4} - h(V_{5i+3}))) \tag{13}$$

$$y_{3,i} = V_7 + \left[(1 - V_1^2 - V_2^2)^{1/2}/V_3\right] \ln(1 + V_3 V_4 (V_{5i+4} - h(V_{5i+3}))) \tag{14}$$

$$R = \{(V_{5i+5} - y_{1,i})^2 + (V_{5i+6} - y_{2,i})^2 + (V_{5i+7} - y_{3,i})^2\}^{1/2} \tag{15}$$

$$U = \{V_4 / (1 + V_3 V_4 (V_{5i+4} + h(V_{5i+3})))\} \tag{16}$$

$$0 = P(U, R) - V_{5i+3} \tag{17}$$

There are 2 unique equations for each transducer and a total of 7 unknowns. Therefore, a minimum of 4 transducers are required to solve the problem. However, if transducers are not properly placed, each transducer may not contribute unique information and more than 4 transducers may be required. It is not intuitive what distributions of sensors will produce unique results. In general, with 4 or more transducers the system is over determined (8 or more equations and 7 unknowns). Unlike linear systems of equations, the nonlinear equations associated with the projectile tracking problem require special iterated solution methods.

In one possible embodiment, a robust but computationally efficient method is to use a random search approach. In this method, an initial estimate is provided to the solver. Equations 11 and 17 are redefined to indicate an error of the estimated solution, $\chi^2$. The sum of the error for all transducers is an indication of the accuracy of the solution.

$$\chi_1^2 = [V_1(y_{1,i} - V_{5i+5}) + V_2(y_{2,i} - V_{5i+6}) + (1 - V_1^2 - V_2^2)^{1/2}(y_{3,i} - V_{5i+7})]^2 \tag{18}$$

$$\chi_2^2 = [P(U,R) - V_{5i+3}]^2 \tag{19}$$

To generate an improved solution, the initial estimate can be perturbed by a random number generator and the error of

TABLE 1

| Vector Variable | Real Variable | Definition | Known Unknown |
|---|---|---|---|
| Variables and Descriptions | | | |
| $V_1$ | $\eta_1$ | x component of flight direction vector | Unknown |
| $V_2$ | $\eta_2$ | y component of flight direction vector | Unknown |
| $V_3$ | $\alpha$ | Ballistic coefficient of projectile | Unknown |
| $V_4$ | $U_0$ | Projectile velocity at origin of flight | Unknown |
| $V_5$ | $Y_{1,1}$ | x component - point of closet approach to sensor 1 | Unknown |
| $V_6$ | $Y_{2,1}$ | y component - point of closest approach to sensor 1 | Unknown |
| $V_7$ | $Y_{3,1}$ | z component - point of closest approach to sensor 1 | Unknown |
| $V_{5i+3}$ | $P_i$ | Peak pressure at transducer i | Known |
| $V_{5i+4}$ | $dt_i$ | Time of occurrence - peak pressure at transducer i | Known |
| $V_{5i+5}$ | $x_{1i}$ | x component of location of sensor i | Known |
| $V_{5i+6}$ | $x_{2i}$ | y component of location of sensor i | Known |
| $V_{5i+7}$ | $x_{3i}$ | z component of location of sensor i | Known |
| | $y_{1i}$ | x component - point of closest approach to sensor i | intermediate |
| | $y_{2i}$ | x component - point of closest approach to sensor i | intermediate |
| | $y_{3i}$ | x component - point of closest approach to sensor i | intermediate |
| | R | Distance from sensor location to point of closest approach | intermediate | the solution recalculated. If the error associated with the new solution is less than that of previous solutions, the new solution is retained; otherwise, a new perturbation is generated. The magnitude of the random perturbation is decreased with iteration number so that increasingly refined solutions are calculated with iteration number.

As noted above, iterative solutions require an initial solution estimate. For the purposes of studying the solution methods, an exact solution can be defined. From the exact solution, specification of the transducer locations, and definition of a speed-distance-pressure model, the time of arrival of the pressure'peak and the magnitude of this peak can be exactly determined. However, to use experimental data, estimates of the projectile performance must be calculated based on engineering judgment.

The numerical assessment and the practical utilization of the tracking method utilize a model relating anticipated peak pressures at transducer locations to projectile speed and range.

Mean pressure disturbance may be modeled using a combination of empirical axis-symmetric cavity geometry, knowledge of the pressure field on the projectile cavitator, and a commercially available potential flow solver. In this way, estimates of likely spatial and temporal mean pressure fluctuations associated with the projectile motion may be obtained.

Figure 2:
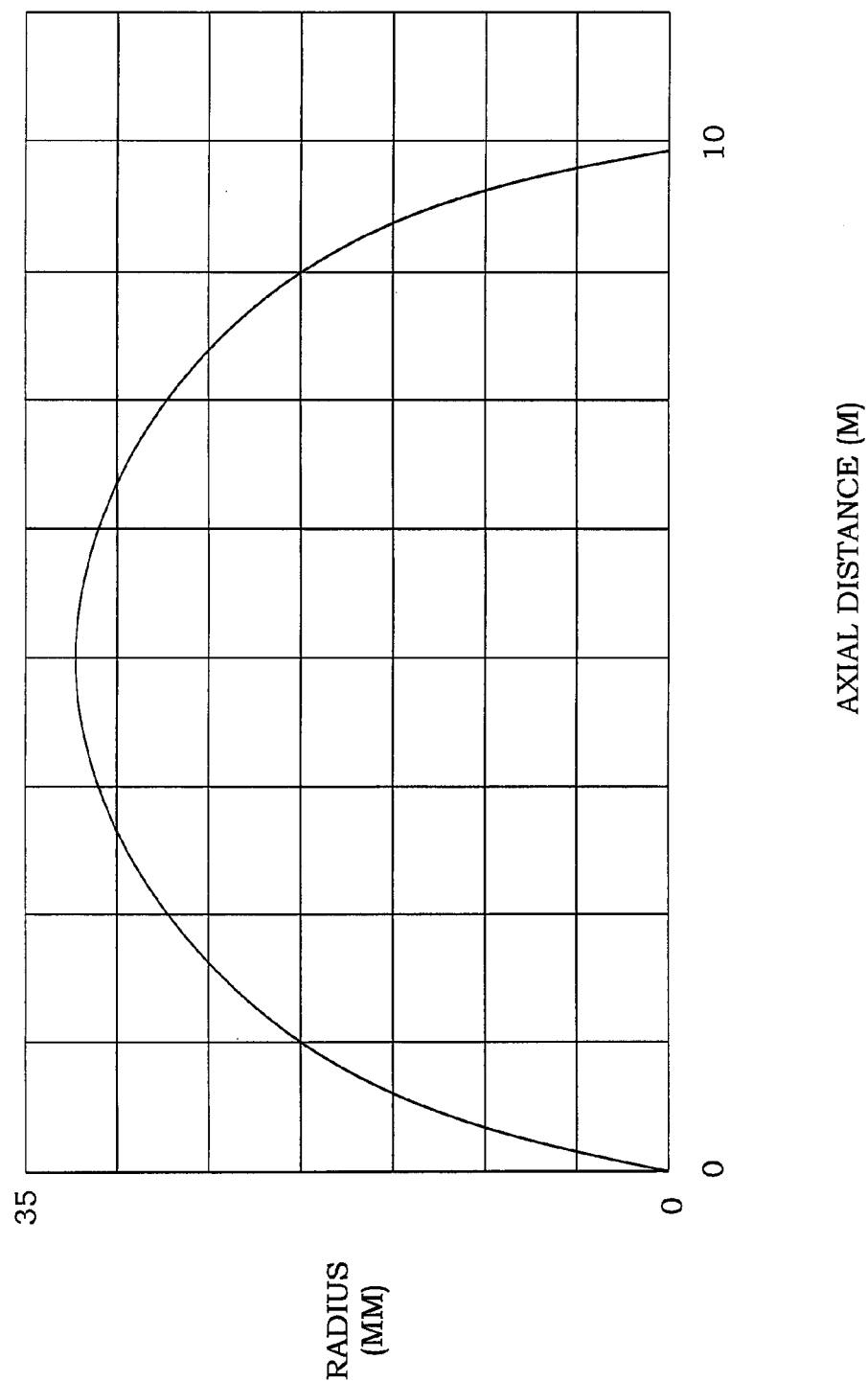
FIG. 2 is a graph of a cavity boundary for a 700 meter per second projective with a 1.7 mm diameter cavitator.
Figure 3:
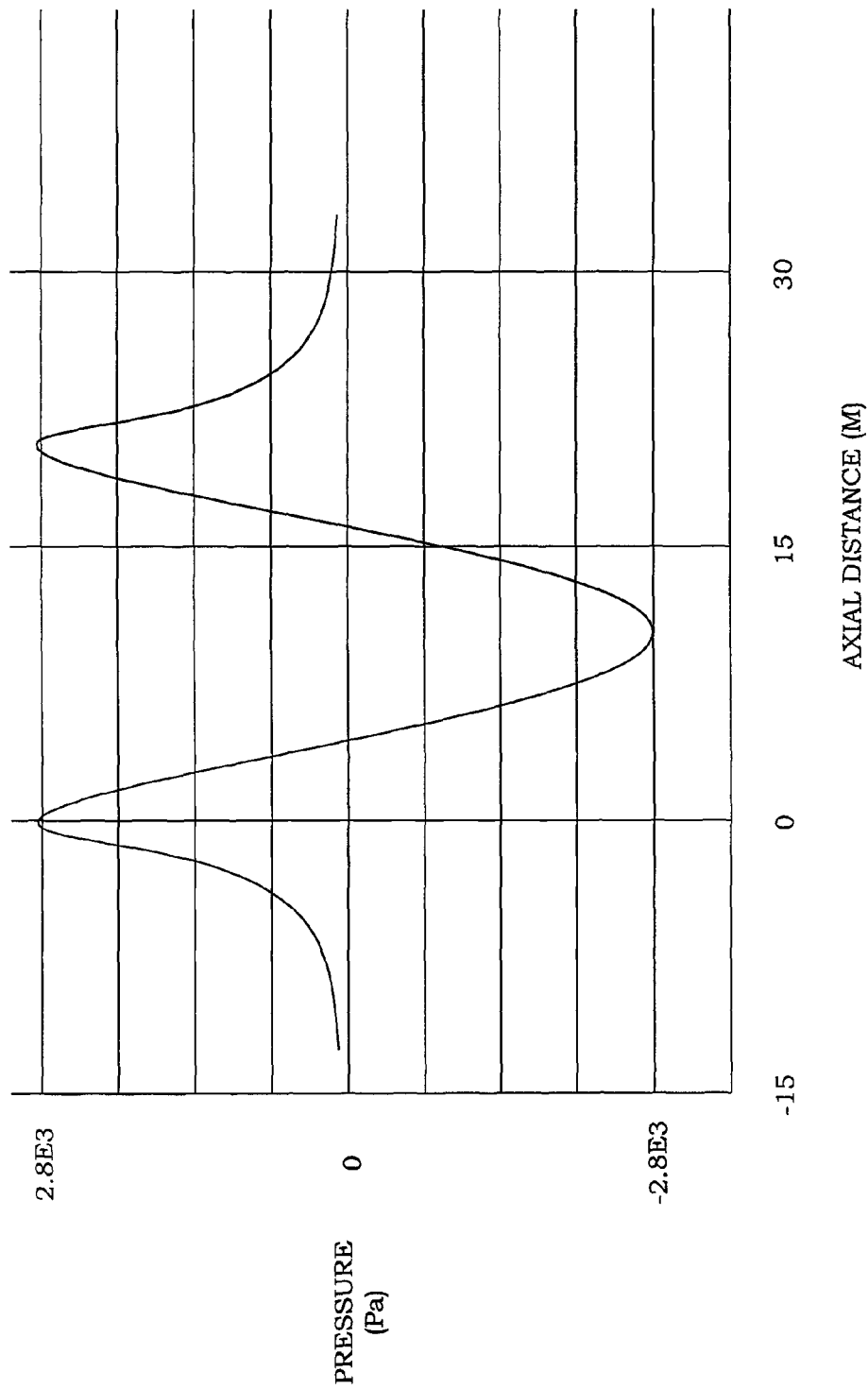
FIG. 3 is a graph of pressure versus axial distance generated by a 900 meter per second underwater projectile at a radial distance of 1.52 meters from the axial path of the underwater projectile.

FIG. 2 shows the cavity boundary for a 700 meter per second projectile with a 1.7 mm diameter cavitator. The origin is at the center of the cavitator. Aerodynamic flow software, such as VSAERO or the like, may be utilized to generate a potential flow solution. For example, FIG. 3 shows a calculation of the pressure in Paschals versus distance along the axis of the trajectory. This calculation is realized at a radial distance of 1.52 m from the axis of the trajectory versus axial distance for a 900 meter per second projectile.

Figure 4:
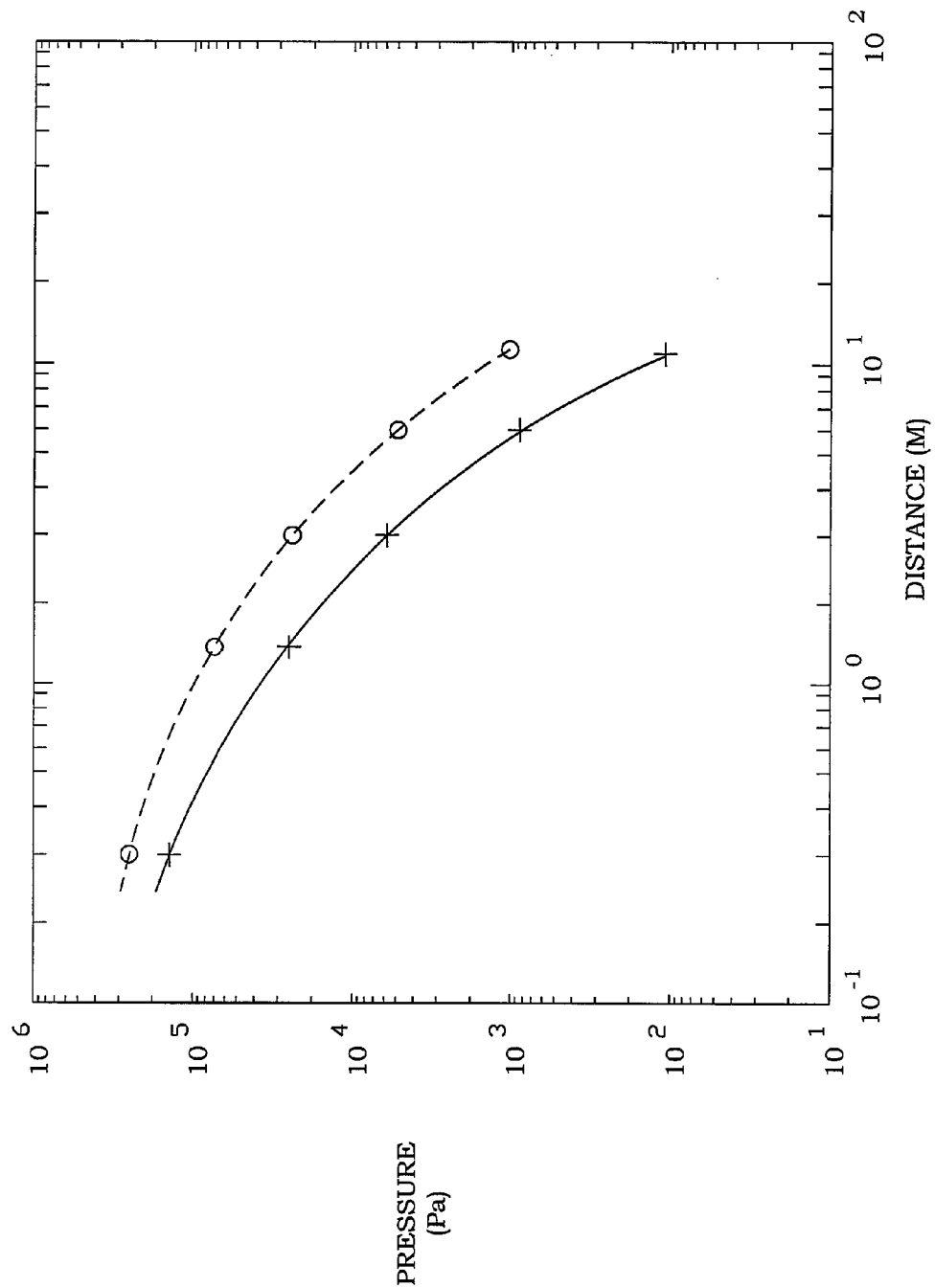
FIG. 4 is a graph of peak pressures versus distance generated by projectiles at 700 meters per second and 900 meters per second.

FIG. 4 summarizes the peak pressures generated by a supercavitating projectile as a function of radial distance for 700 meters per second and 900 meters per second projectiles. A functional relationship between pressure, velocity and distance can be approximated as:

$$P(U, R) = \exp\left( \begin{array}{c} [C_{11}U^2 + C_{12}U + C_{13}][\log(R)]^2 + \\ [C_{21}U^2 + C_{22}U + C_{23}][\log(R)] + C_{31}U^2 + C_{32}U + C_{33} \end{array} \right) \quad (20)$$

Figure 5:
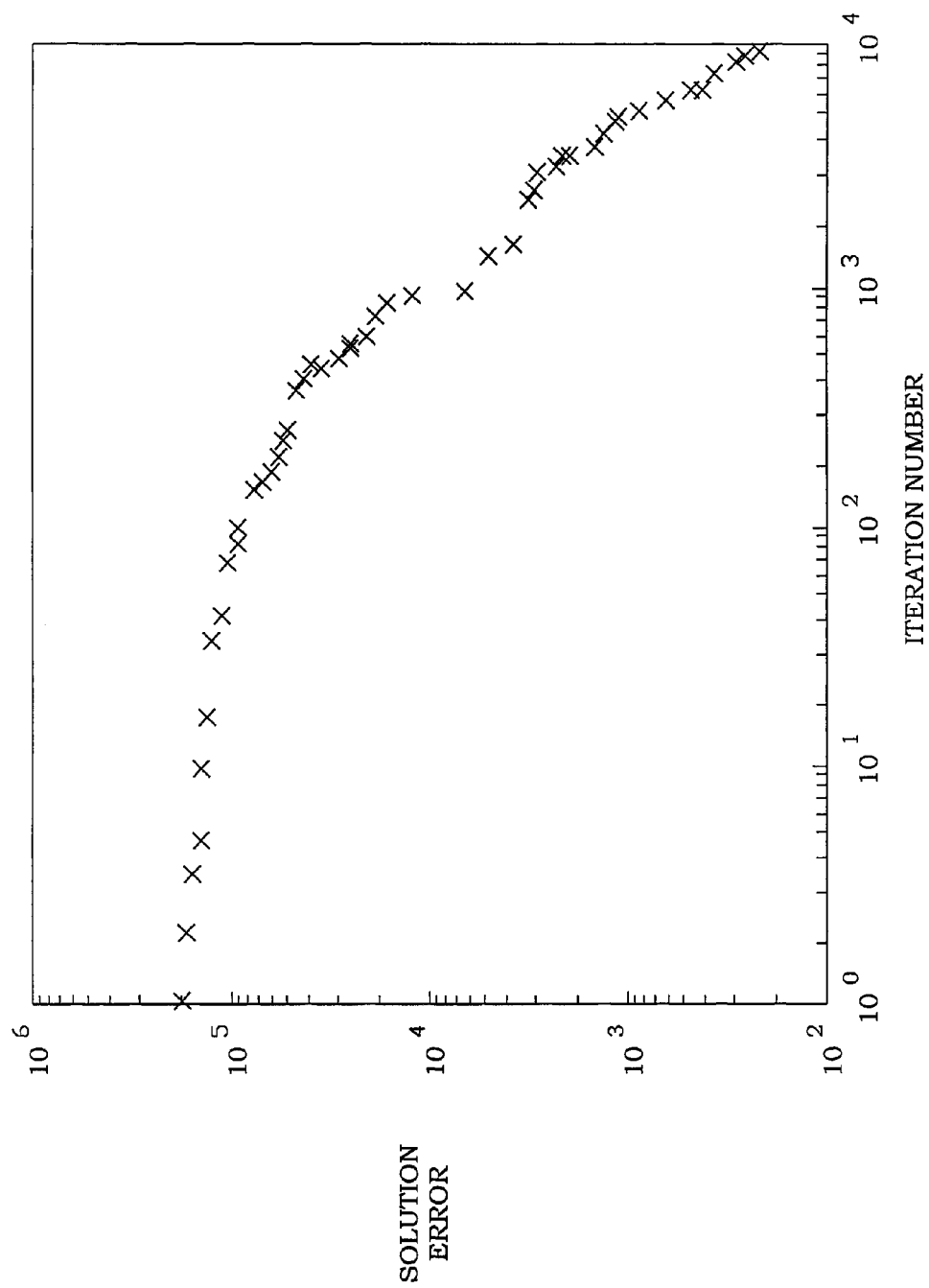
FIG. 5 is a graph of solution error as a function of iteration number in accord with one possible embodiment of the present invention.

With an estimate of the peak pressure and time of arrival for each transducer in a notational array, equations of 11 to 17 can be solved using the iterative procedures described in this document. FIG. 5 shows the variation in total error as a function of iteration number for a 20 sensor configuration.

TABLE 2

Convergence Error after 10,000 Iterations

| Variable | Exact | Initial Guess | Calculated |
|---|---|---|---|
| $\eta_1$ | 0.00e+000 | −3.36e−002 | −3.63e−005 |
| $\eta_2$ | 0.00e+000 | −4.11e−002 | −9.25e−006 |
| $\alpha$ | 1.99e−002 | 3.37e−002 | 1.99e−002 |
| $U_0$ m/s | 8.00e+002 | 1.07e+002 | 8.00e+002 |
| $Y_{1,1}$ | 0.00e+000 | 1.25e+000 | 2.79e−004 |
| $Y_{2,1}$ | 0.00e+000 | −2.28e−001 | 1.13e−004 |
| $Y_{3,1}$ | 4.00e+000 | 1.59e+001 | 3.99e+000 |

The accuracy of the tracking method can be estimated by considering the changes in output (dependent) variables (V) with each of the input (independent) variables (X: peak pressure, time of occurrence of peak pressure, and x,y,z location for each transducer). The Jacobian is defined as the matrix of these partial derivatives:

$$J = \begin{bmatrix} \frac{\partial V_1}{\partial X_1} & \frac{\partial V_2}{\partial X_1} & \cdots & \frac{\partial V_n}{\partial X_1} \\ \frac{\partial V_1}{\partial X_2} & \frac{\partial V_2}{\partial X_2} & \cdots & \frac{\partial V_n}{\partial X_2} \\ \vdots & \vdots & & \vdots \\ \frac{\partial V_1}{\partial X_m} & \frac{\partial V_2}{\partial X_m} & \cdots & \frac{\partial V_n}{\partial X_m} \end{bmatrix} \quad (21)$$

Here n=7 (number of unknown variables) and m=5 times the number of sensors (known variables).

The Jacobian can be calculated by computing the change in the solution with changes in each of the variables. This calculation is completed by first computing a baseline solution or exact solution. A series of subsequent solutions are then completed by perturbing the input parameters one at a time by a finite amount, $\delta_i$. The difference between the exact solution and the perturbed solution is $\partial V_{j,i}$ where j indicates an output variable and i indicates an input variable.

Calculation of the Jacobian using this method has two shortfalls. First, the calculation assumes that the changes in the dependent variables V are linearly related to the independent variables for small changes in X. However, the relationships are highly nonlinear. For example, changes from the different sensors (different curves) yield different changes in launch velocity.

Second, the chosen method for calculation of the Jacobian assumes that a unique solution exists that minimizes the errors in equations 18 and 19. It has been found that unless an exact solution exists, there are multiple solutions to the governing set of equations that can minimize the solution error. In one embodiment, the most reliable way to calculate the required $\partial V_{j,i}$ is to calculate the values with gradually increasing $\delta_i$.

With a fully resolved Jacobian, the overall solution error can be calculated based on uncertainties in the input quantities. Once again, these perturbations are defined as $\delta_i$. However, when estimating overall uncertainty, the perturbations are given as one standard deviation of the uncertainty in the input variables. The resulting error is then one standard deviation of the uncertainty in the solution. As the problem is currently posed, the number of input variables is five times the number of sensors in the underwater array (Nsen). The resulting uncertainty in the solution output is given by:

$$E_j = \left[ \frac{\sum_{i=1}^{5Nsen} (J_{j,i}\delta_i)^2}{5Nsen} \right]^{1/2} \quad (22)$$

Because solution uncertainty is a function of the accuracy of measured input variables, an estimate of these uncertainties must be established prior to completing the uncertainty analysis.

There are a total of five input variables for each transducer in the passive tracking array: peak pressure, time of arrival, x location, y location and z location. The error in each of these variables can be estimated based on data obtained during testing on both indoor and outdoor ranges. The pressure signal produced during the passage of a supercavitating projectile contains three major elements: pressure acoustic signal from the gun, pressure field associated with projectile passage, and cavity closure noise. When these elements occur at different times, the amplitude of the peak pressure and the time of its occurrence can be clearly discerned.

The gun noise and the projectile passage pressure field occur nearly simultaneously at very close distances to the gun muzzle. Under some circumstances, the time of occurrence of the two signals can be separated. However, the amplitude of the projectile passage pressure field can be altered as a result of the gun noise pressure waves and large errors can occur.

The time after launch where the cavity closure and projectile passage signals coincide can be approximated as:

$$\Delta t_{noise} = \frac{x}{c} + \frac{L_{cavity}}{U_{bullet}} = \Delta t_{pressure} = \frac{x}{U_{bullet}}, \text{ or} \quad (23)$$

$$x = \frac{L_{cavity}}{\left(1 - \frac{U_{bullet}}{c}\right)}$$

In equation 23, $U_{bullet}$ (is the average velocity of the projectile, c is the speed of sound in the medium, and $L_{cavity}$ is the length of the cavity generated by the projectile. Although more accurate measures can be calculated for this quantity, equation 23 provides a first order estimate of where the signals become overlapped. For projectiles typically tested, the distance where the projectile passage pressure field and the cavity closure noise become overlapped is between 15 meters and 25 meters down range of the gun.

Based on sample data, pressure peak can be estimated to within plus or minus 10,000 Pa (to approximately 95% confidence) and time of occurrence can be estimated to within plus or minus 0.001 seconds.

The anticipated error in sensor position cannot be measured directly. In all tests, transducers were suspended from free hanging lines. Their positions along the line could be accurately measured (to within 0.05 m) as could the horizontal location of the suspension point of the lines. What could not be measured was drift, shrinkage of the lines, and any errors associated with rotation of the lines. For the balance of this analysis, it is assumed that the transducer locations are known to within 0.1 meters in all three directions.

A single array configuration was analyzed to estimate the accuracy of the proposed projectile tracking system. Transducers were distributed along four lines roughly parallel to the projectile track. The first transducer was located four meters down range of the gun and three meters to the left of the shot line. The second transducer was located six meters down range of the gun and three meters above the shot line. The third transducer was located eight meters down range and three meters to the right of the shot line. The fourth transducer was located ten meters down range and three meters below the shot line. This pattern continued until a total of twenty transducers are used in the array. The error calculations generally show decreasing errors with the number of transducers in the arrays.

If it is only possible to measure the time of arrival of the pressure peak and it is not possible to accurately measure the projectile passage peak pressure, equations 11 through 16 can be used to calculate the trajectory information. The disadvantage of this approach is that each transducer only provides one piece of information and consequently twice as many transducers are needed to generate solutions.

The tracking system developed and evaluated in this document meets the desired requirements for open range testing of undersea projectiles. In one possible embodiment, the desired requirements are as follows: the system must be portable, the components should be low-cost and readily available, signal processing should be robust, trajectory accuracy should be within 0.1 degrees, velocity accuracy should be within 10 meters per second, and drag accuracy should be within 10%.

Based on anticipated and measured uncertainties in position, time of arrival, and peak pressures, transducer configurations can be selected to provide the required accuracy. When peak pressure can be accurately measured (within $1 \times 10^4$ Pa), arrays containing ten or more transducers can be configured to track individual projectiles to the specified accuracies. When only timing information is available, it is not clear that the desired accuracies can be achieved with acceptable numbers of transducers (less than twenty).

To achieve optimal performance of the passive tracking system, accurate measurement of field pressures is required. Directional sensitive arrays would offer advantages over omnidirectional transducers. These transducers could reject gun noise and cavity closure noise to produce more accurate peak pressure measurements. Based on analysis and measurement, the distributed array of pressure transducers and hydrophones of the present invention appears to be a viable and cost-effective diagnostic system.

System 10 may operate in the presence of other tracking systems and may operate at any sea depth and in any sea state. System 10 tracks high speed objects but may also be utilized to track underwater objects traveling at any subsonic speed.

In summary, the present invention provides a system for three-dimensional-tracking of undersea projectiles utilizing a distributed field of passive acoustic sensors. The system measures launch velocity, flight direction (trajectory), ballistic coefficient (drag), and maximum range. The system measures the pressure field generated by a supercavitating projectile. The theoretical basis of the method is tied to the predictable pressure field generated/by a supercavitating projectile in flight. The amplitude of the pressure generated at a point in space and the time that this peak pressure is realized is related to the projectile dimensions, velocity, and trajectory. An iterative method to solve equations describing the relationships is presented herein. Based on the form of the equations and anticipated uncertainties and measured quantities, the accuracy of the method is predicted for various array configurations.

Many additional changes in the details, components, steps, and organization of the system, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. A system for tracking an underwater object comprising:
   a plurality of randomly distributed passive pressure transducers at positions offset from a projected path of said underwater object, said plurality of randomly distributed passive pressure transducers comprising directional transducers, each said transducer being operable to detect a peak transient pressure;
   a data flow path operatively connected to each of said plurality of passive pressure transducers for transferring data produced thereby; and
   at least one processor joined to said data flow path and operable for utilizing said data produced by said plurality of randomly distributed passive pressure transducers to determine a trajectory of said underwater object wherein said at least one processor is programmed to iteratively determine the trajectory based on an initial estimate of a velocity and a trajectory.

2. The system of claim 1, wherein said processor is programmed to utilize a time of occurrence of said peak transient pressure and an amplitude of said peak transient pressure to determine said trajectory.

3. The system of claim 2, wherein said processor is also programmed to determine a ballistic coefficient of said underwater object.

4. The system of claim 2, wherein said processor is programmed to distinguish peak pressure from a noise made during launch of the underwater object.

5. The system of claim 2, wherein said processor is programmed to distinguish peak pressure from a cavity closure noise made during passage of the underwater object.

6. The system of claim 1, wherein said plurality of randomly distributed passive pressure transducers are randomly positioned within one hundred feet of said path of said underwater object.

7. The system of claim 1, wherein said plurality of randomly distributed passive pressure transducers comprises less than twenty but more than ten of said passive pressure transducers.

8. The system of claim 1 wherein said at least one processor iteratively produces a trajectory by:
    determining an error of said initial estimate for each of said plurality of passive pressure transducers;
    computing a sum of the determined errors;
    producing a perturbed estimate by perturbing said initial estimate of velocity and trajectory with a random perturbation having a perturbation magnitude;
    determining a perturbed error of said perturbed estimate for each of said plurality of passive pressure transducers;
    computing a perturbed sum of the determined perturbed errors;
    comparing said perturbed sum against said sum, replacing said original estimate with said perturbed estimate if said perturbed sum is less than said sum, and retaining said original estimate if said sum is less than said perturbed sum; and
    iterating said steps of producing a perturbed estimate, determining a perturbed error, computing a perturbed sum and comparing with a lower perturbation magnitude until trajectory accuracy is within 0.1 degrees, and velocity accuracy is within 10 meters per second.

9. The system of claim 1, wherein the processor is specifically programmed to determine the trajectory of the underwater object when the underwater object has a velocity greater than 0.3 Mach.

10. A method for detecting velocity and trajectory of an underwater object comprising:
    supporting a plurality of passive pressure transducers in water at a plurality of depths, said plurality of passive pressure transducers being arranged in said water so as to extend along at least a portion of a projected underwater path of said underwater object wherein said plurality of passive pressure transducers are directional passive pressure transducers;
    launching an underwater object;
    producing acoustic signal data comprising peak transient pressures and times of arrival of said peak transient pressures with respect to times at which said underwater object passes a point of closest approach for each of said plurality of passive pressure transducers; and
    determining said velocity and trajectory of said underwater object in real time utilizing said peak transient pressures and times of arrival of said peak transient pressures with respect to times at which said underwater object passes said point of closest approach for each of said plurality of passive pressure transducers, said step of determining further including formulating an initial estimate of said velocity and trajectory, and iteratively producing a solution for said velocity and said trajectory based on the initial estimate of said velocity and trajectory.

11. The method of claim 10, further comprising providing that said plurality of passive pressure transducers are randomly positioned within one hundred feet of said projected path of said underwater object.

12. The method of claim 10, further comprising determining a ballistic coefficient of said underwater object.

13. The method of claim 10, further comprising utilizing less than twenty but more than ten of said passive pressure transducers.

14. The method of claim 10, further comprising the step of distinguishing peak pressure from launch noise prior to said step of determining the velocity and trajectory.

15. The method of claim 10, further comprising the step of distinguishing peak pressure from cavity closure noise prior to said step of determining the velocity and trajectory.

16. The method of claim 10, where said step of determining said velocity and trajectory comprises:
    determining an error of said initial estimate for each of said plurality of passive pressure transducers;
    computing a sum of the determined errors;
    producing a perturbed estimate by perturbing said initial estimate with a random perturbation having a perturbation magnitude;
    determining a perturbed error of said perturbed estimate for each of said plurality of passive pressure transducers;
    computing a perturbed sum of the determined perturbed errors;
    comparing said perturbed sum against said sum, replacing said original estimate with said perturbed estimate if said perturbed sum is less than said sum, and retaining said original estimate if said sum is less than said perturbed sum; and
    iterating said steps of producing a perturbed estimate, determining a perturbed error, computing a perturbed sum and comparing with a lower perturbation magnitude until trajectory accuracy is within 0.1 degrees, and velocity accuracy is within 10 meters per second.

* * * * *